(12) United States Patent
Saitoh et al.

(10) Patent No.: US 12,508,724 B2
(45) Date of Patent: Dec. 30, 2025

(54) VACUUM PAD SWING PREVENTION MECHANISM

(71) Applicant: SMC CORPORATION, Tokyo (JP)

(72) Inventors: Masaru Saitoh, Tsukubamirai (JP); Yukiya Goto, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 331 days.

(21) Appl. No.: 18/329,882

(22) Filed: Jun. 6, 2023

(65) Prior Publication Data

US 2023/0405840 A1    Dec. 21, 2023

(30) Foreign Application Priority Data

Jun. 16, 2022  (JP) .................. 2022-097093

(51) Int. Cl.
  *B25J 15/06* (2006.01)
  *B25B 11/00* (2006.01)
(52) U.S. Cl.
  CPC ......... *B25J 15/0683* (2013.01); *B25B 11/005* (2013.01)
(58) Field of Classification Search
  CPC .. B25B 11/005; B25J 15/0691; B25J 15/0683
  See application file for complete search history.

(56) References Cited

U.S. PATENT DOCUMENTS

| | | | |
|---|---|---|---|
| 11,091,355 B1* | 8/2021 | Lilliston, III | ......... B25B 11/005 |
| 11,845,181 B1* | 12/2023 | Atamer | ................ B25J 15/0052 |
| 2020/0377314 A1* | 12/2020 | Ikeda | ................... B65G 47/918 |
| 2021/0245335 A1* | 8/2021 | Yonezawa | ................ G09F 9/00 |
| 2023/0405840 A1* | 12/2023 | Saitoh | ................. B25J 15/0616 |

FOREIGN PATENT DOCUMENTS

| | | |
|---|---|---|
| JP | 2010-188465 A | 9/2010 |
| JP | 2020-192648 A | 12/2020 |
| JP | 2021-32345 A | 3/2021 |

OTHER PUBLICATIONS

Extended European Search Report issued Oct. 27, 2023 in European Patent Application No. 23177455.5, 8 pages.

* cited by examiner

*Primary Examiner* — Lee D Wilson
(74) *Attorney, Agent, or Firm* — Oblon, McClelland, Maier & Neustadt, L.L.P.

(57) ABSTRACT

A vacuum pad includes a support member that includes a vacuum passage and a bellows that is attached to the support member, and the cover body includes a cylindrical body portion, an attaching portion projecting from one end of the body portion, and a flange portion projecting radially outward from another end of the body portion. The cover body covers the outside of the bellows when the bellows contracts and holds a workpiece by suction.

17 Claims, 16 Drawing Sheets

VACUUM PAD SWING PREVENTION MECHANISM

CROSS-REFERENCE TO RELATED APPLICATIONS

This application is based upon and claims the benefit of priority from Japanese Patent Application No. 2022-097093 filed on Jun. 16, 2022, the contents of which are incorporated herein by reference.

BACKGROUND OF THE INVENTION

Field of the Invention

The present invention relates to a vacuum pad swing prevention mechanism for preventing swings of a vacuum pad that attracts and holds a workpiece by suction force due to negative pressure (vacuum pressure).

Description of the Related Art

Conventionally, there has been known a vacuum pad that generates negative pressure inside a bellows and that holds a workpiece by suction at an open end of the bellows. Because the vacuum pad is provided with an extendable bellows, the vacuum pad can attract a workpiece, following various shapes of the workpiece, and can easily attract a workpiece placed in an inclined state.

There is also known a technique according to which a vacuum pad provided with a bellows is devised so that a workpiece is held in a stable state even when external force acts on the workpiece. For example, JP 2010-188465 A discloses that a fixing rod for preventing inclination of a workpiece is disposed outside a bellows-type suction pad.

SUMMARY OF THE INVENTION

When a workpiece is transported at a high speed using a vacuum pad provided with a bellows, if a large acceleration or deceleration acts on the workpiece, there is a case where the bellows violently swings while deforming. The technique disclosed in JP 2010-188465 A was not made by paying attention to such a phenomenon, and the technique for preventing swings of the bellows has not been developed sufficiently.

The present invention has the object of solving the aforementioned problems.

A vacuum pad swing prevention mechanism according to the present invention includes a vacuum pad and a cover body attached to the vacuum pad, wherein the vacuum pad includes a support member that includes a vacuum passage and a bellows that is attached to the support member, and the cover body includes a cylindrical body portion, an attaching portion projecting from one end of the body portion, and a flange portion projecting radially outward from another end of the body portion. The cover body covers the outside of the bellows when the bellows contracts and holds a workpiece by suction. The cover body is attached to the vacuum pad by the attaching portion being screwed onto the support member, and an attaching position of the cover body with respect to the vacuum pad is adjustable.

According to the vacuum pad swing prevention mechanism of the present invention, the cover body covers the outside of the bellows when the bellows contracts and holds the workpiece by suction. Therefore, even when the workpiece is transported at high speed and a large acceleration or deceleration acts on the workpiece, deformation of the bellows is prevented by the cover body, and swing of the bellows is reliably prevented. Further, the cover body is attached to the vacuum pad by the attaching portion being screwed onto the support member, and the attaching position of the cover body with respect to the vacuum pad can be adjusted. Therefore, the attaching position of the cover body can easily be changed according to the length of the bellows to be used.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
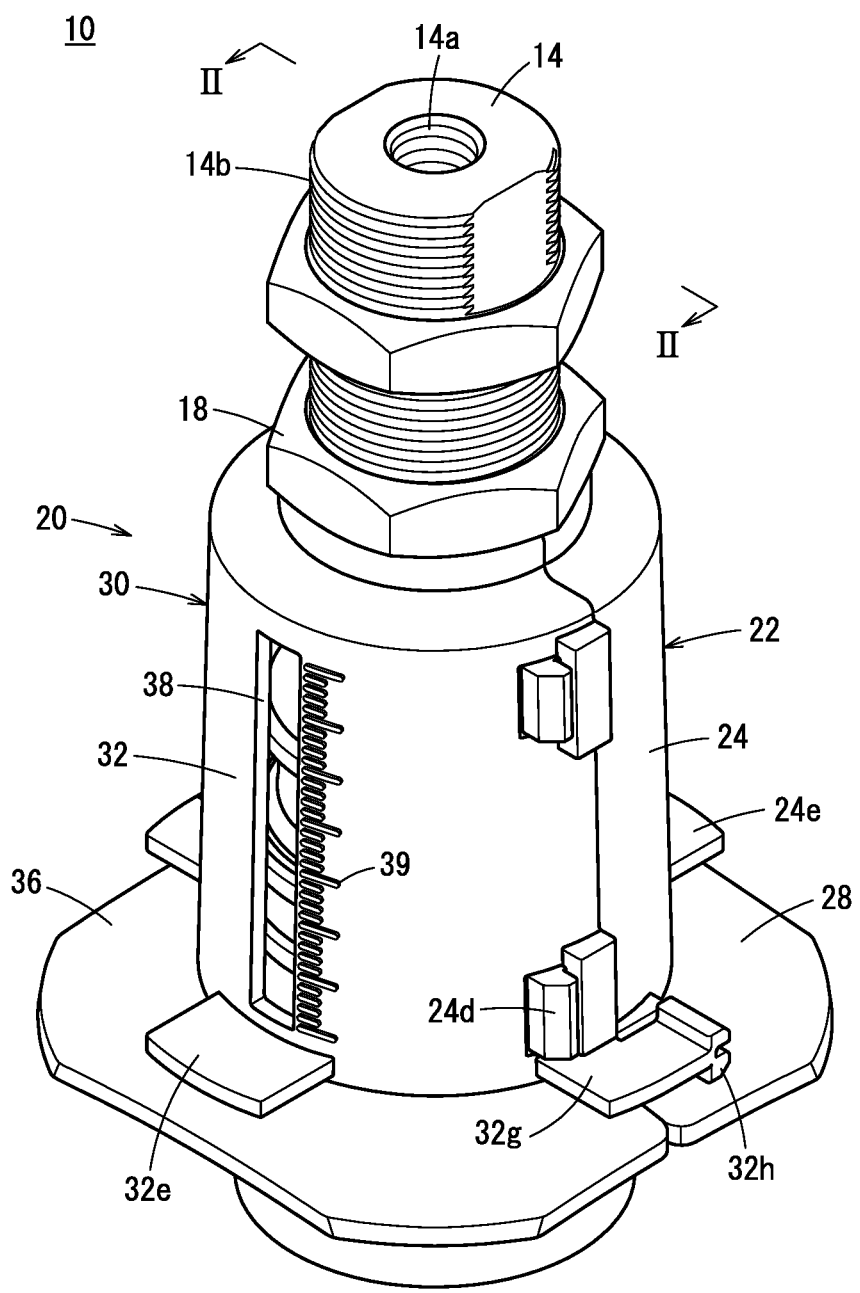
FIG. 1 is an external view of a vacuum pad swing prevention mechanism according to an embodiment of the present invention.
Figure 2:
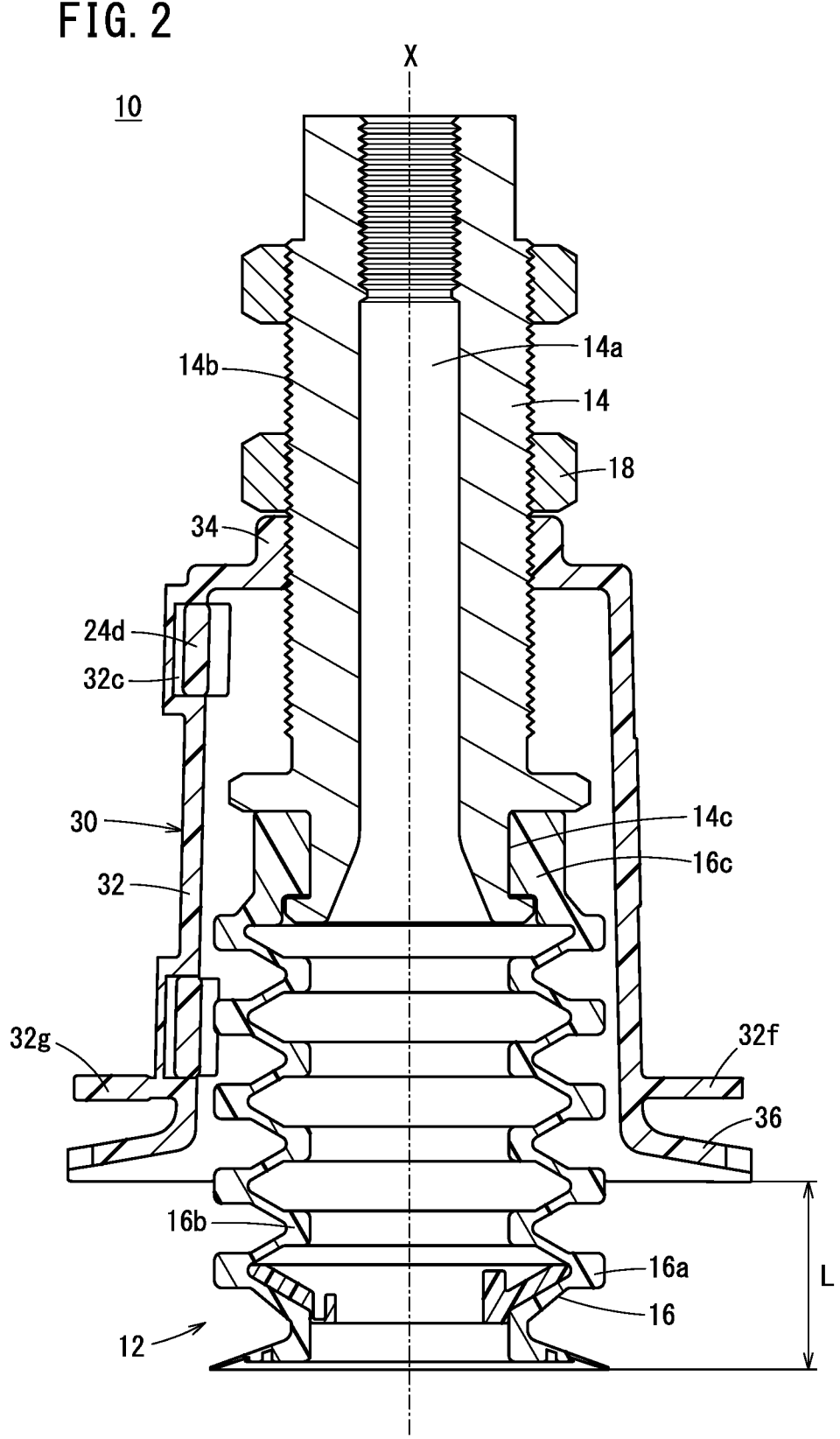
FIG. 2 is a cross-sectional view taken along line II-II of the vacuum pad swing prevention mechanism shown in FIG. 1.

As shown in FIGS. 1 and 2, a vacuum pad swing prevention mechanism 10 according to an embodiment of the present invention includes a vacuum pad 12 and a cover body 20.

The vacuum pad 12 includes a cylindrical support member 14 having a vacuum passage 14a therein, and a bellows 16 attached to a lower portion of the support member 14. The vacuum passage 14a extends along the axis X of the support member 14 and opens at both upper and lower ends of the support member 14. Negative pressure from a vacuum generating device (not shown) is supplied to the upper end of the vacuum passage 14a. The support member 14 has an outer thread 14b on the outer periphery over a predetermined length and has a concave groove 14c on the outer periphery below the outer thread 14b. A lock nut 18 is screwed onto the support member 14.

The bellows 16 is formed in a cylindrical shape and made from a rubber material such as silicone or a resin material. The bellows 16 has a pleated structure in which ring-shaped thick portions 16a projecting from an outer wall and ring-shaped thick portions 16b projecting from an inner wall are alternately formed, and the bellows 16 can be vertically expanded and contracted. The internal space of the bellows 16 communicates with the vacuum passage 14a of the support member 14. A lower end surface of the bellows 16 is in contact with the workpiece. The upper end of the bellows 16 has a flange portion 16c that projects radially inward. The bellows 16 is attached to the support member 14 by the flange portion 16c fitting into the concave groove 14c of the support member 14.

Figure 4:
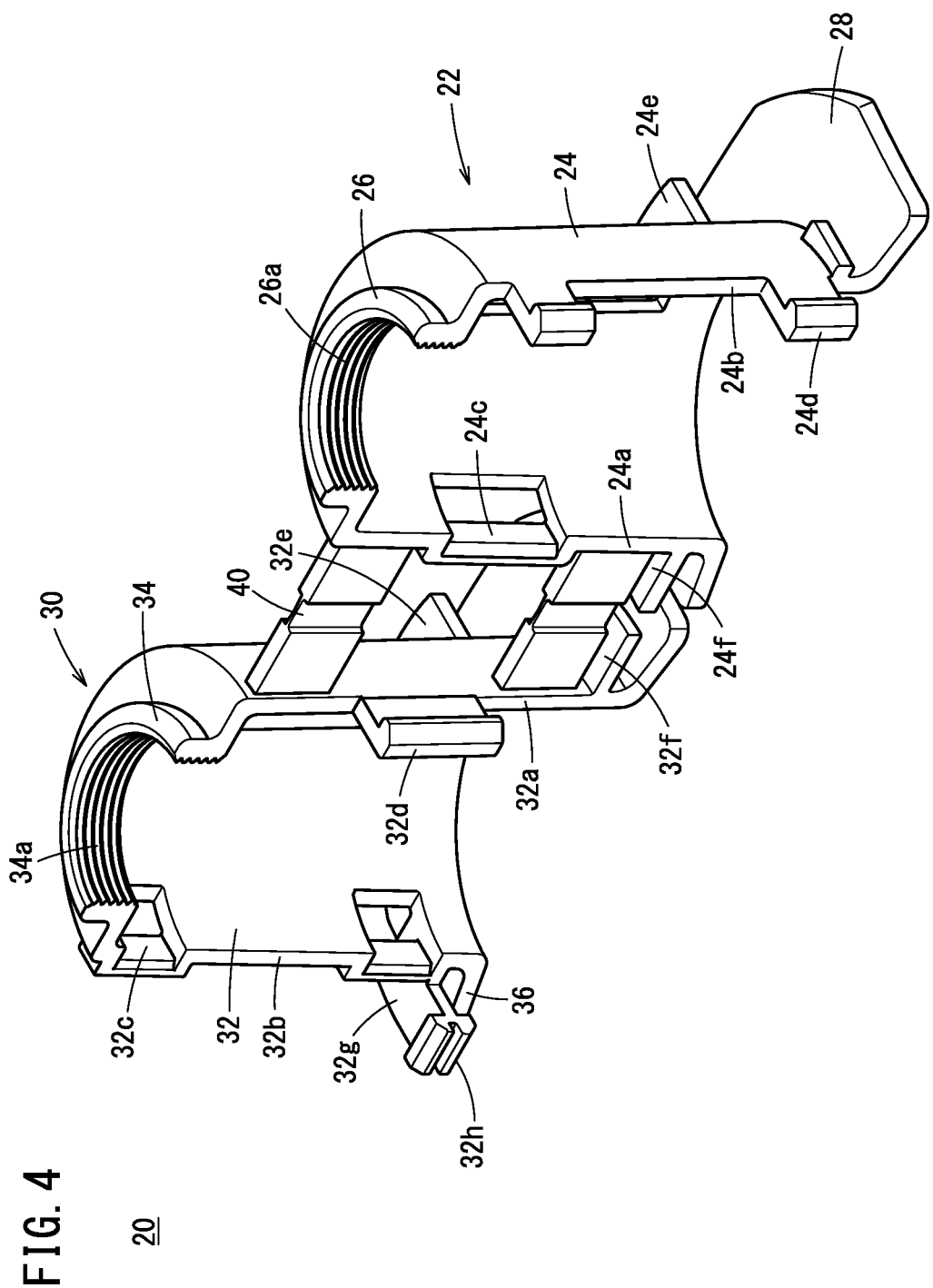
FIG. 4 is a view showing a cover body of the vacuum pad swing prevention mechanism shown in FIG. 1, in a state of being prior to attachment.

As shown in FIG. 4, the cover body 20 includes a first cover body 22 and a second cover body 30 that are coupled to each other via a hinge portion 40 so as to be relatively pivotable. The first cover body 22 and the second cover body 30 includes semi-cylindrical body portions 24, 32, attaching portions 26, 34 that reduce in diameter and project from the upper ends of the body portions 24, 32, and flange portions 28, 36 that project radially outward from the lower ends of the body portions 24, 32. The inner diameters of the body portions 24 and 32 of the first cover body 22 and the second cover body 30 are slightly larger than the outer diameter of the bellows 16.

Hereinafter, the body portion 24 of the first cover body 22 and the body portion 32 of the second cover body 30 may be collectively referred to as the body portions 24 and 32 of the cover body 20. Further, the attaching portion 26 of the first cover body 22 and the attaching portion 34 of the second cover body 30 may be collectively referred to as the attaching portions 26 and 34 of the cover body 20. The flange portion 28 of the first cover body 22 and the flange portion 36 of the second cover body 30 may be collectively referred to as the flange portions 28 and 36 of the cover body 20.

The attaching portions 26 and 34 of the cover body 20 have inner threads 26a and 34a that are screwed onto the outer thread 14b of the support member 14. The flange portions 28, 36 of the cover body 20 come into contact with the workpiece at the lower end surfaces thereof. The body portions 24, 32 of the cover body 20 have first mating portions 24a, 32a that abut each other at a position close to the hinge portion 40, and second mating portions 24b, 32b that abut each other at a position apart from the hinge portion 40.

The body portion 24 of a first cover body 22 is provided with an engaging concave portion 24c in the vicinity of the first mating portion 24a and with a pair of engaging pieces 24d projecting from the second mating portion 24b. The body portion 32 of the second cover body 30 is provided with an engaging piece 32d projecting from the first mating portion 32a and with a pair of engaging concave portions 32c in the vicinity of the second mating portion 32b. Each engaging piece 24d of the first cover body 22 engages with each engaging concave portion 32c of the second cover body 30. The engaging piece 32d of the second cover body 30 engages with the engaging concave portion 24c of the first cover body 22.

A lower portion of the body portion 24 of the first cover body 22 is provided with a first projecting piece 24e that projects outward from a central portion in the circumferential direction of the lower portion and with a second projecting piece 24f that projects outward near the first mating portion 24a. The first projecting piece 24e and the second projecting piece 24f face the flange portion 28 with a predetermined gap in between. A lower portion of the body portion 32 of the second cover body 30 is provided with a third projecting piece 32e projecting outward from a central portion in the circumferential direction of the lower portion, a fourth projecting piece 32f projecting outward in the vicinity of the first mating portion 32a, and a fifth projecting piece 32g projecting outward in the vicinity of the second mating portion 32b. The third projecting piece 32e, the fourth projecting piece 32f, and the fifth projecting piece 32g face the flange portion 36 with a predetermined gap in between.

When the first cover body 22 and the second cover body 30 abut against each other, the body portions 24 and 32 of the cover body 20 form a cylindrical shape. When the first cover body 22 and the second cover body 30 abut against each other, the second projecting piece 24f of the first cover body 22 and the fourth projecting piece 32f of the second cover body 30 form one continuous projecting piece (hereinafter referred to as "continuous projecting piece"). The first projecting piece 24e, the continuous projecting piece, the third projecting piece 32e, and the fifth projecting piece 32g have the same shape as each other and are arranged at equal intervals (at intervals of 90 degrees) in the circumferential direction of the cover body 20.

The fifth projecting piece 32g includes a hook portion 32h for positioning and fixing an extension plate 42 that will be described later. A slit 32i into which a tool such as a driver can be inserted is formed at the tip of the hook portion 32h (see FIG. 7). The body portions 24, 32 of the first cover body 22 and the second cover body 30 have elongated windows 38 extending in the vertical direction. The operator can confirm an attaching position of the bellows 16 through a window 38. A scale 39 is displayed on a side area of the window 38.

The cover body 20 is attached to the vacuum pad 12 through, for example, the following procedure. The first cover body 22 and the second cover body 30 are pivoted relative to each other and are largely opened, and the second cover body 30 is spread over the vacuum pad 12 from a side direction of the vacuum pad 12. Next, in order to cover the vacuum pad 12 with the first cover body 22, the first cover body 22 is pivoted in the closing direction.

When the first cover body 22 is pivoted in the closing direction, the engaging pieces 24d of the first cover body 22 engage with the engaging concave portions 32c of the second cover body 30, and the engaging piece 32d of the second cover body 30 engages with the engaging concave portion 24c of the first cover body 22. In addition, the first mating portions 24a, 32a of the first cover body 22 and the second cover body 30 abut each other, and the second mating portions 24b and 32b of the first cover body 22 and the second cover body 30 abut each other. The attaching portions 26 and 34 of the cover body 20 are screwed onto and are attached to the support member 14. At this time, the axis X of the cover body 20 coincides with the axis X of the support member 14.

Figure 3:
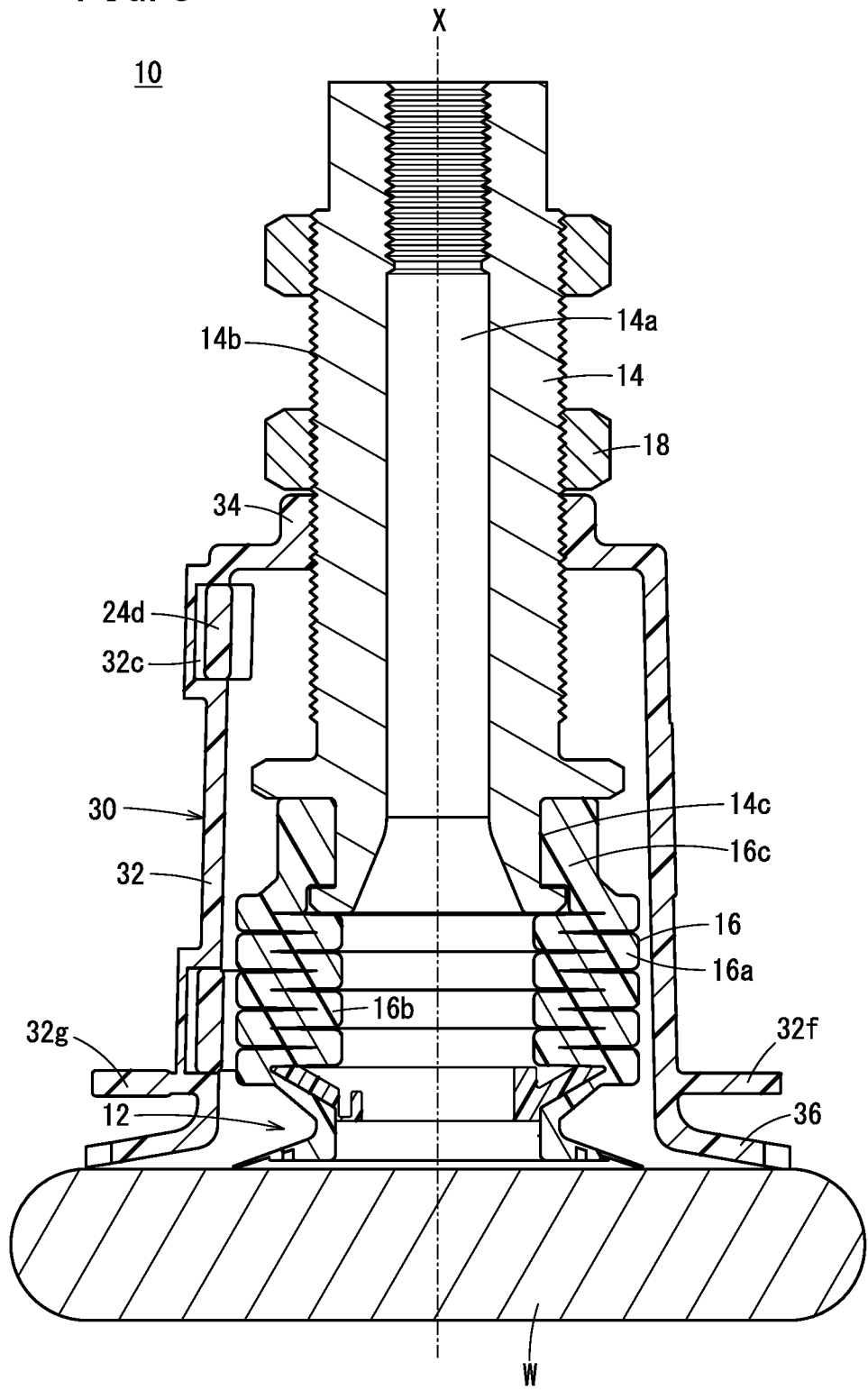
FIG. 3 is a view corresponding to FIG. 2 at the time of workpiece suction.

Next, an attaching position of the cover body 20 with respect to the support member 14 is adjusted so that the cover body 20 covers the outside of the bellows 16 when the bellows 16 contracts and holds the workpiece by suction. FIG. 3 shows a state in which a workpiece W, which is for example a kind of frozen food, is held by suction by the vacuum pad swing prevention mechanism 10. In this case, the cover body 20 pivots about the axis X of the support member 14 and the position of the attaching portions 26, 34 is adjusted so that the lower end surfaces of the flange portions 28, 36 of the cover body 20 are flush with the lower end surface of the bellows 16 when the lower end surface of the bellows 16 is displaced upward by a contraction amount L of the bellows 16.

Because an operator can confirm the position of the bellows 16 through the window 38 of the first cover body 22 or the second cover body 30, the adjustment operation described above can be easily performed. Thereafter, the lock nut 18 is tightened to press the lock nut 18 against the attaching portions 26 and 34 of the cover body 20, whereby the attaching of the cover body 20 is finished.

When the bellows 16 contracts and holds the workpiece by suction, the lower end surfaces of the flange portions 28 and 36 of the cover body 20 are not always flush with the lower end surface of the bellows 16. For example, in a case where the workpiece is in a bag-like shape and the workpiece itself deforms, part of the workpiece enters into the inner side of the cover body 20 when the workpiece is held by suction; as a result, the lower end surfaces of the flange portions 28 and 36 of the cover body 20 project further downward than the lower end surface of the bellows 16.

The vacuum pad 12 is attached to a vacuum generating device (not shown) at an upper end of the support member 14. Since the first cover body 22 and the second cover body 30 are put from a side direction of the vacuum pad 12, which is a direction where the attaching of the cover body 20 is not hindered, the cover body 20 alone can be attached and detached without removing the vacuum pad 12 from the vacuum generating device.

Figure 5:
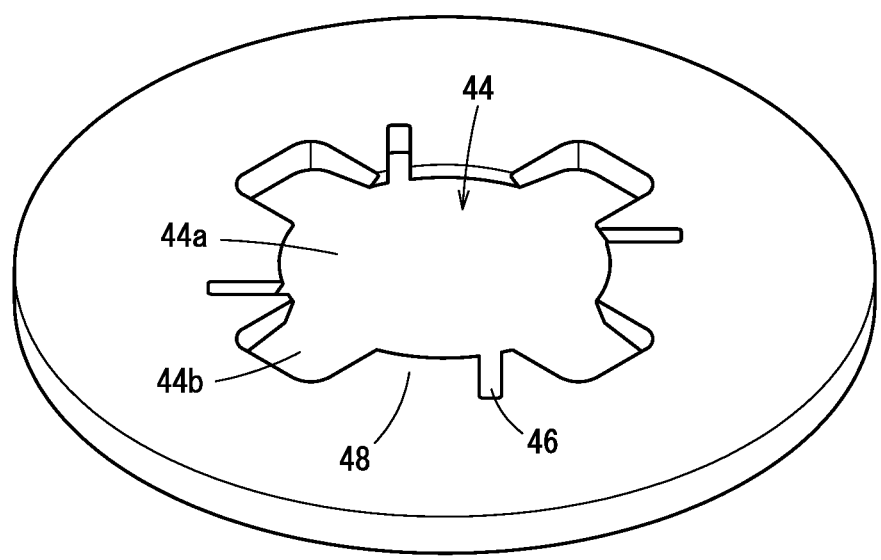
FIG. 5 is an external view of an extension plate.

It is preferable that an extension plate corresponding to the shape and size of the workpiece W be attached to the cover body 20. A circular extension plate 42 is shown in FIG. 5. The extension plate 42 has a hole 44 at a central portion. The hole 44 includes a central hole 44a that allows the body portions 24 and 32 of the cover body 20 to be inserted, and four peripheral holes 44b extending in a cross shape from the central hole 44a. The four peripheral holes 44b have the same shape and have a shape through which the first projecting piece 24e, the continuous projecting piece, the third projecting piece 32e, and the fifth projecting piece 32g of the cover body 20 can be inserted. Each of the peripheral holes 44b is large enough for the hinge portion 40 to pass through.

The extension plate 42 has an insertion portion 48 between adjacent peripheral holes 44b. Each insertion portion 48 is formed with a slit 46 extending substantially in the radial direction. The thickness of the extension plate 42 is substantially equal to a gap with which the first projecting piece 24e, the continuous projecting piece, the third projecting piece 32e, and the fifth projecting piece 32g face the flange portions 28, 36 of the cover body 20.

Figure 6:
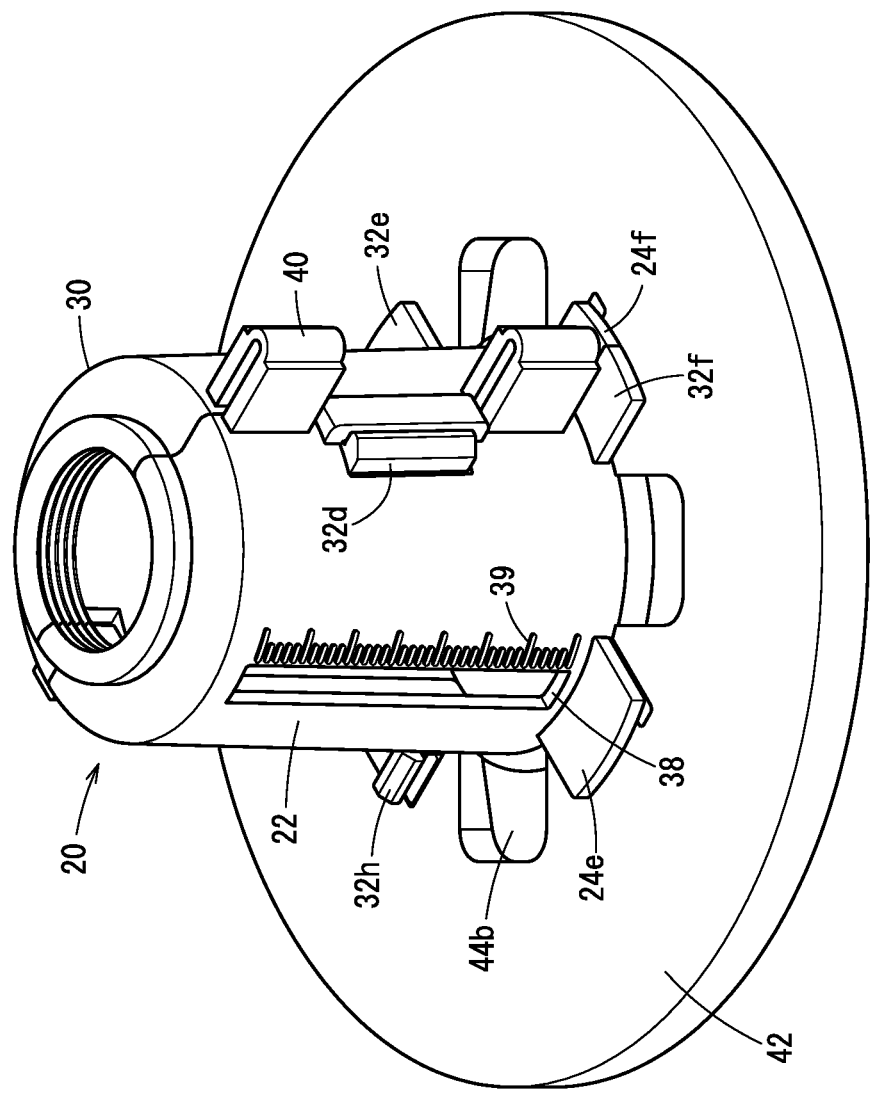
FIG. 6 is a view showing a state in which the extension plate of FIG. 5 is attached to the cover body of the vacuum pad swing prevention mechanism of FIG. 1.
Figure 7:
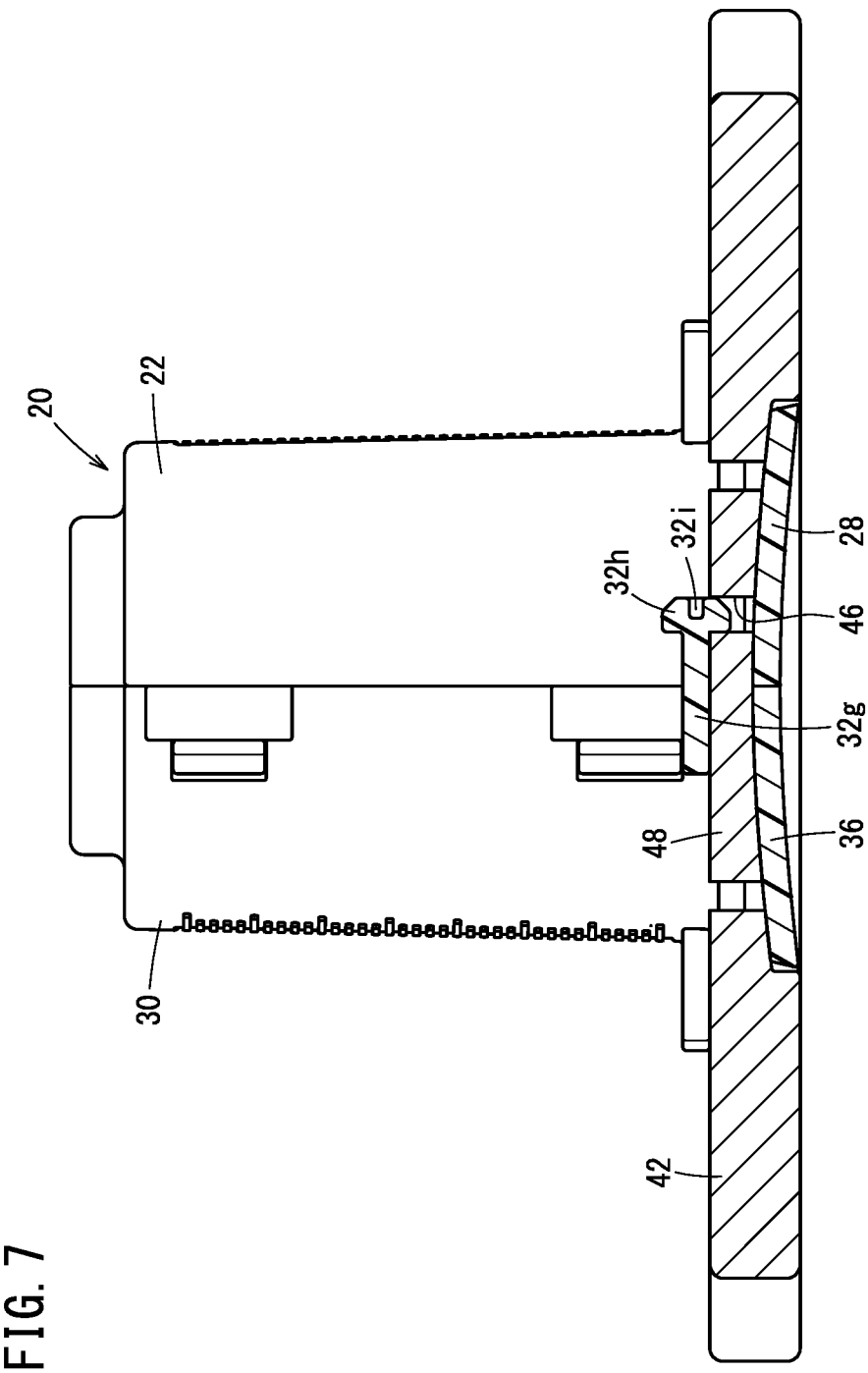
FIG. 7 is a view including a cross section of a principal part of the extension-plate-attached vacuum pad swing prevention mechanism of FIG. 6.

Next, a procedure for attaching the extension plate 42 to the cover body 20 will be described with reference to FIGS. 6 and 7. First, the extension plate 42 is fitted into the cover body 20 from above the cover body 20. That is, the body portions 24 and 32 of the cover body 20 are inserted into the central hole 44a of the extension plate 42, and further the hinge portion 40, the first projecting piece 24e, the continuous projecting piece, the third projecting piece 32e, and the fifth projecting piece 32g are inserted into the peripheral holes 44b of the extension plate 42. In this case, since the four projecting pieces have the same shape and the four peripheral holes 44b have the same shape, each projecting piece can be inserted into an arbitrary peripheral hole. The hinge portion 40 and the continuous projecting piece are inserted into one peripheral hole 44b.

When the extension plate 42 is fitted into the cover body 20, the lower surface of the extension plate 42 comes into contact with the upper surfaces of the flange portions 28 and 36 of the cover body 20. Thereafter, the tip of a driver (not shown) is inserted into the slit 32i of the hook portion 32h, and the extension plate 42 is rotated about the axis X of the cover body 20 while the hook portion 32h is lifted. The insertion portion 48 of the extension plate 42 enters into a gap with which the first projecting piece 24e, the continuous projecting piece, the third projecting piece 32e, and the fifth projecting piece 32g face the flange portions 28 and 36 of the cover body 20. When the extension plate 42 is rotated by approximately 45 degrees, the hook portion 32h elastically engages with one of the slits 46 of the extension plate 42. Thus, the extension plate 42 is positioned and fixed to the cover body 20. The direction in which the extension plate 42 is rotated about the axis X of the cover body 20 can be either direction.

In the case that the extension plate 42 is detached from the cover body 20, the tip of the driver is inserted into the slit 32i of the hook portion 32h, the hook portion 32h is lifted, and the extension plate 42 is rotated. When the extension plate 42 is rotated by approximately 45 degrees, each peripheral hole 44b of the extension plate 42 is aligned with the first projecting piece 24e, the continuous projecting piece, the third projecting piece 32e, and the fifth projecting piece 32g of the cover body 20. Thus, the extension plate 42 can be detached from the cover body 20. Although the extension plate 42 of the present embodiment is circular, the shape of the extension plate can be variously designed such as a rectangular shape according to the shape of the workpiece.

According to the vacuum pad swing prevention mechanism 10 according to the present embodiment, when the bellows 16 contracts and holds the workpiece by suction, the outside of the bellows 16 is covered with the cover body 20 with a slight gap therebetween. Therefore, even if the workpiece W is transported at a high speed and a large acceleration or deceleration acts on the workpiece W, deformation of the bellows 16 is prevented by the cover body 20, and swing of the bellows 16 is reliably prevented.

Further, the cover body 20 is attached to the vacuum pad 12 by the attaching portions 26 and 34 being screwed onto the support member 14, and the attaching position of the cover body 20 to the vacuum pad 12 can be adjusted. Moreover, the body portions 24 and 32 of the cover body 20 have the windows 38 through which the attaching position of the bellows 16 can be checked from the outside. Therefore, the attaching position of the cover body 20 can be easily adjusted depending on the length of the bellows 16 to be used.

Further, since the first cover body 22 and the second cover body 30, which are connected to each other via the hinge portion 40 so as to be relatively pivotable, can sequentially cover the vacuum pad 12 from the side direction of the vacuum pad 12, the cover body 20 alone can be easily attached and detached.

(First Modification Example of Extension Plate)

Figure 8:
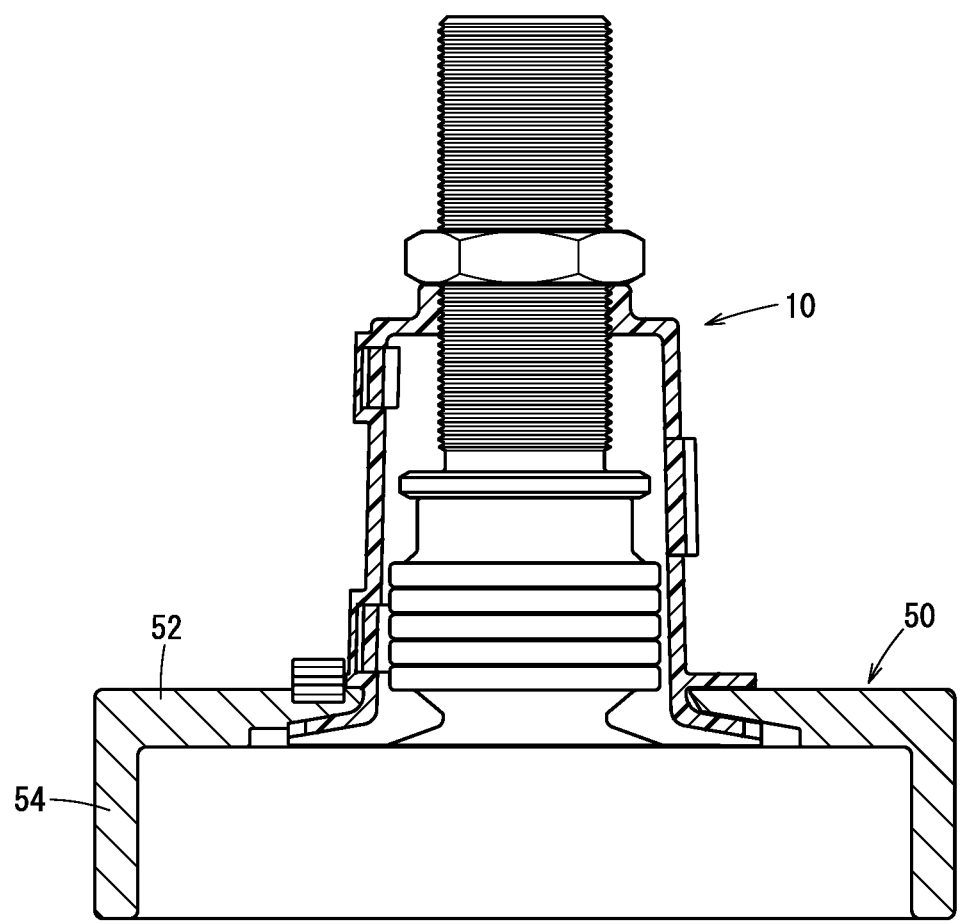
FIG. 8 is a view for explaining a first modification example of the extension plate of FIG. 5.

FIG. 8 shows a vacuum pad swing prevention mechanism 10 having an extension plate 50 according to a first modification example. The extension plate 50 includes a circular plate portion 52 and a cylindrical skirt portion 54 extending downward from the outer periphery of the plate portion 52. Because the sides of the workpiece can be covered with the skirt portion 54, it is possible to prevent the workpiece from skidding in the direction of transportation when the workpiece is held by suction and is transported. Further, when a soft and delicate workpiece is held by suction, the workpiece can be protected so as not to be crushed. Further, it is possible to prevent the workpiece from coming into contact with surrounding devices or the like when the workpiece is transported.

(Second Modified Example of Extension Plate)

Figure 9:
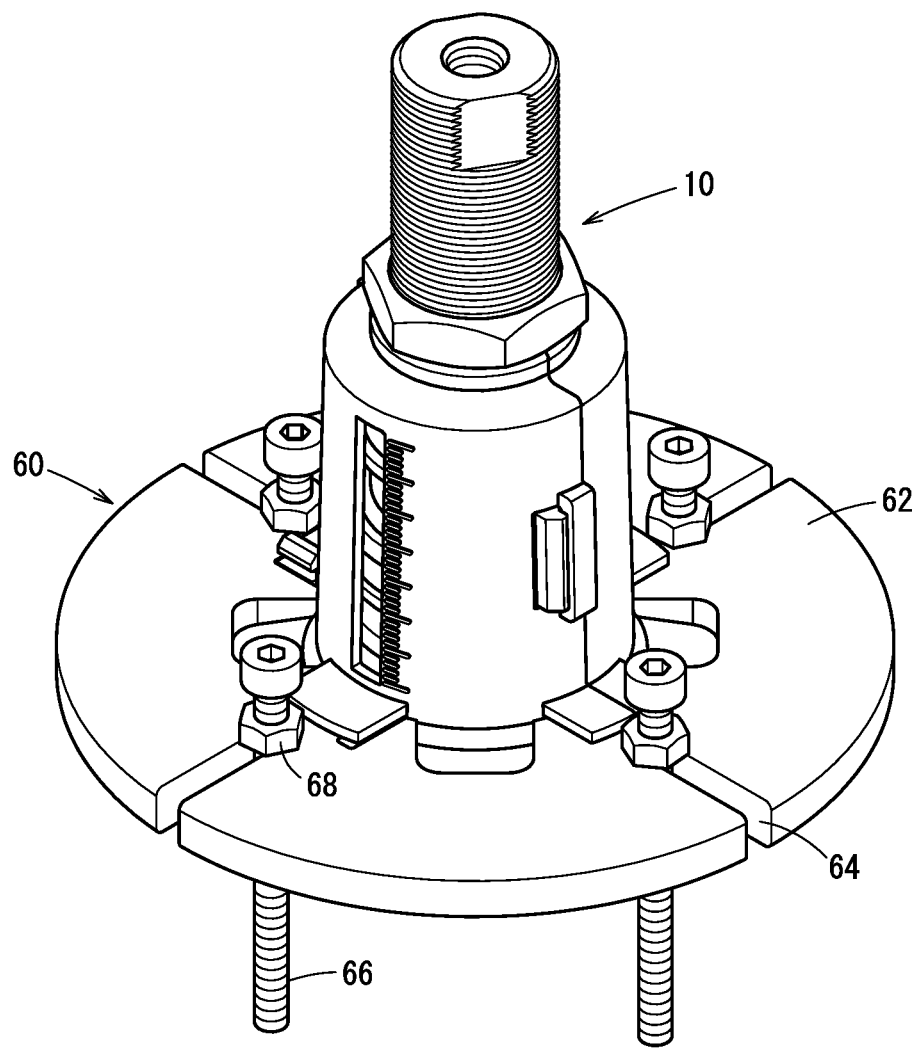
FIG. 9 is a view for explaining a second modification example of the extension plate of FIG. 5.

FIG. 9 shows a vacuum pad swing prevention mechanism 10 having an extension plate 60 according to a second modification example. The extension plate 60 is formed by combining a circular plate body 62 and a plurality of guide shafts 66 arranged in a direction perpendicular to the plate surface of the plate body 62. The plate body 62 has a plurality of slits 64 cut out radially inward from the outer peripheral edge. The plurality of slits 64 are arranged at substantially equal intervals in the circumferential direction.

A guide shaft 66 having an external thread is inserted through each slit 64 and fixed to the plate body 62 using a pair of nuts 68. Specifically, the guide shaft 66 onto which the pair of nuts 68 have been screwed is inserted through the slit 64, and the plate body 62 is held between the pair of nuts 68. Thus, the guide shaft 66 is fixed to the plate body 62 at a desired position on the slit 64 and is fixed to the plate body 62 in a state of projecting downward from the plate body 62 by a desired length.

With the extension plate 60, a plurality of guide shafts 66 are arranged on the outside of the workpiece, whereby the workpiece can be protected when the workpiece is held by suction and transported, and the workpiece can be prevented from skidding. Moreover, because the positions and heights of the plurality of guide shafts 66 can be adjusted, it is possible to cope with workpieces of different shapes, sizes, and so on without exchanging the plate body 62.

(Third Modification Example of Extension Plate)

Figure 10:
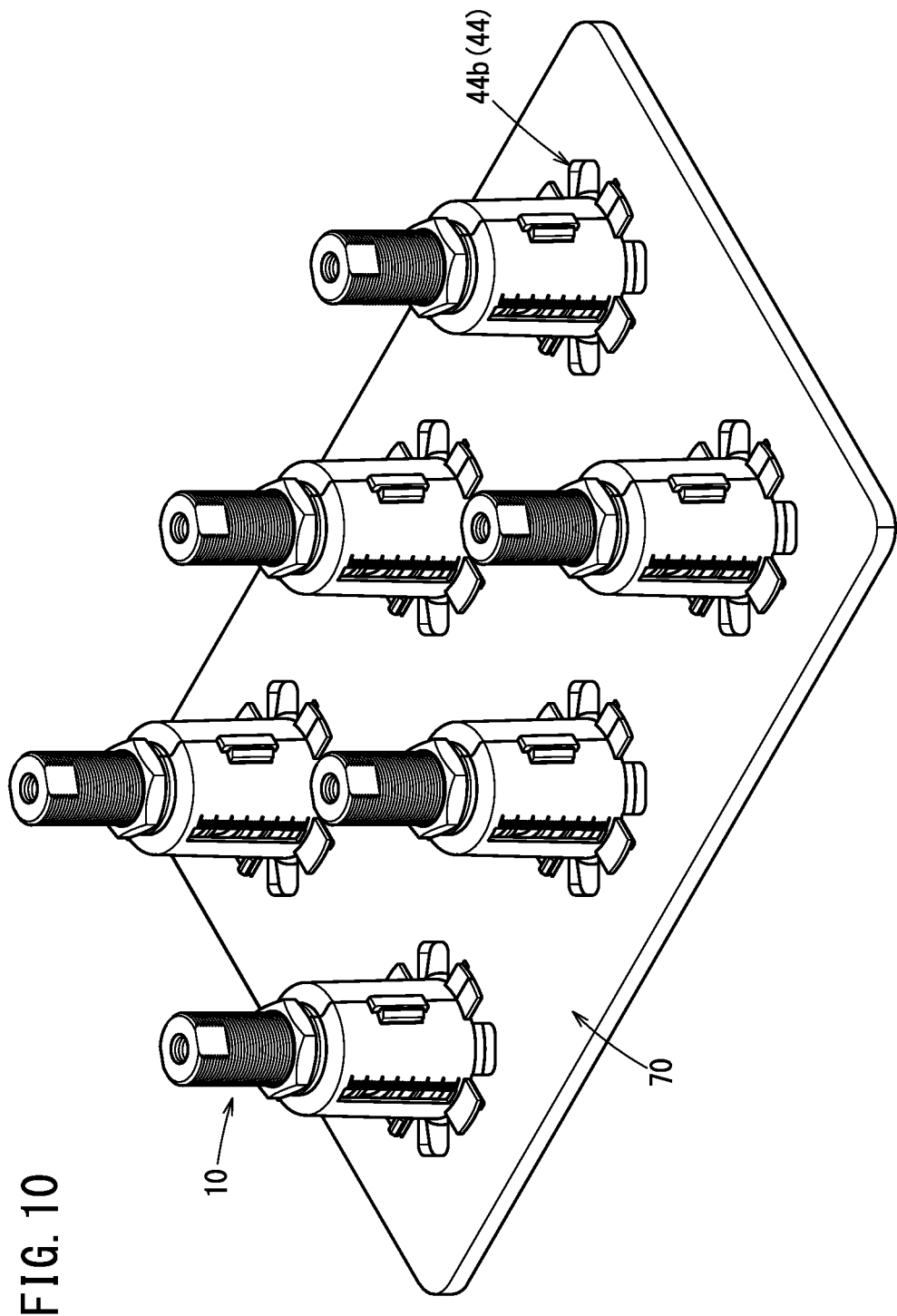
FIG. 10 is a view for explaining a third modification example of the extension plate of FIG. 5.

FIG. 10 shows a vacuum pad swing prevention mechanism 10 having an extension plate 70 according to a third modification example. The extension plate 70 has a plurality of regularly arranged holes 44. Cover bodies 20 of a plurality of vacuum pad swing prevention mechanisms 10 are attached to one extension plate 70. In this modification example, a total of six vacuum pad swing prevention mechanisms 10 are arranged. According to the extension plate 70, a plurality of vacuum pad swing prevention mechanisms 10 can be arranged regularly.

(Modification Example of Cover Body)

Figure 11:
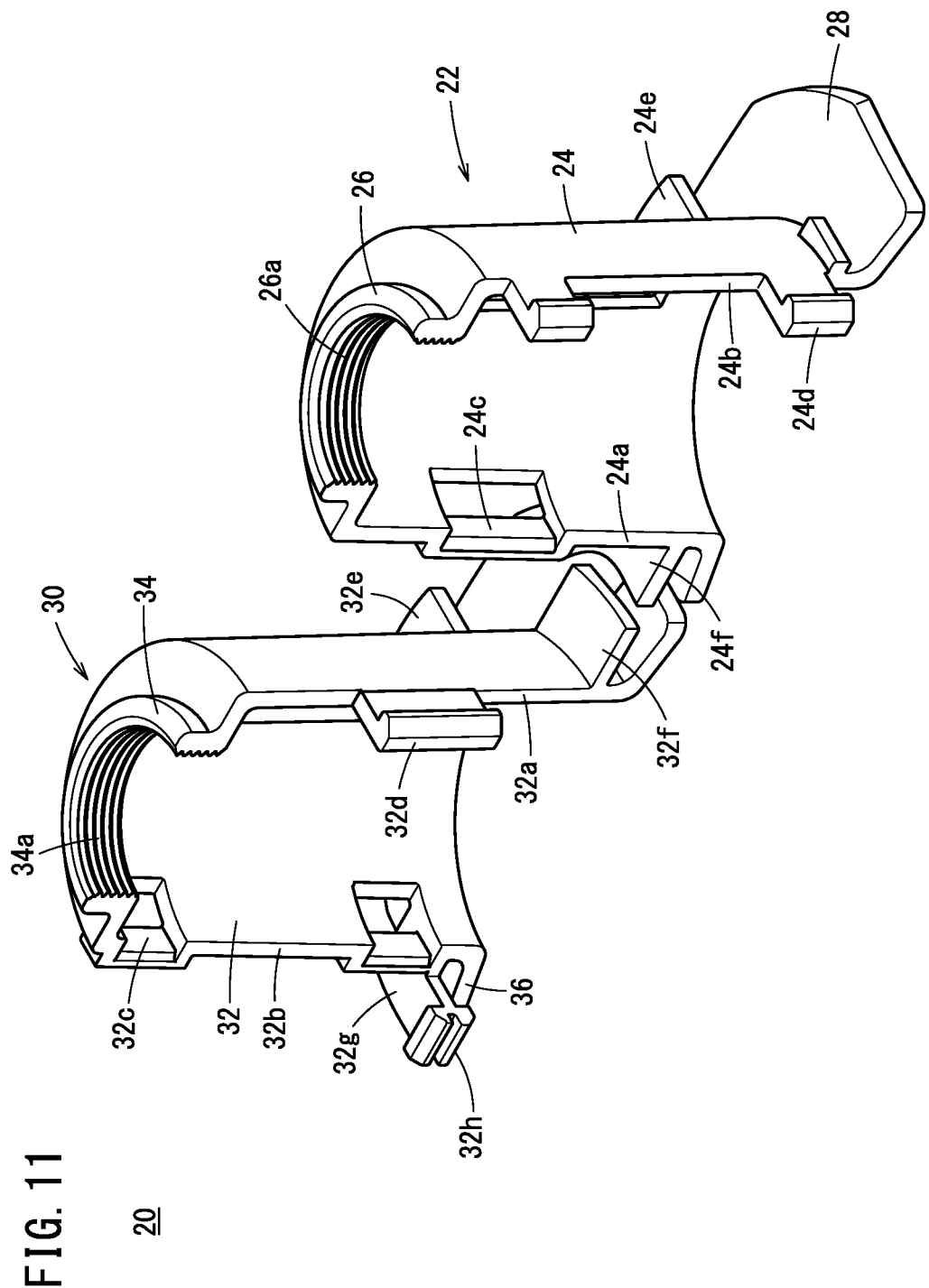
FIG. 11 is a view for explaining a modification example of the cover body of FIG. 4.

A modification example of the cover body 20 is shown in FIG. 11. The cover body 20 of the above-described vacuum pad swing prevention mechanism 10 has a structure in which the first cover body 22 and the second cover body 30 are coupled to each other via the hinge portion 40 so as to be relatively rotatable. However, as shown in FIG. 11, the first cover body 22 and the second cover body 30 may be separable members.

(First Modification Example of Extension-Plate Positioning Structure)

Figure 12:
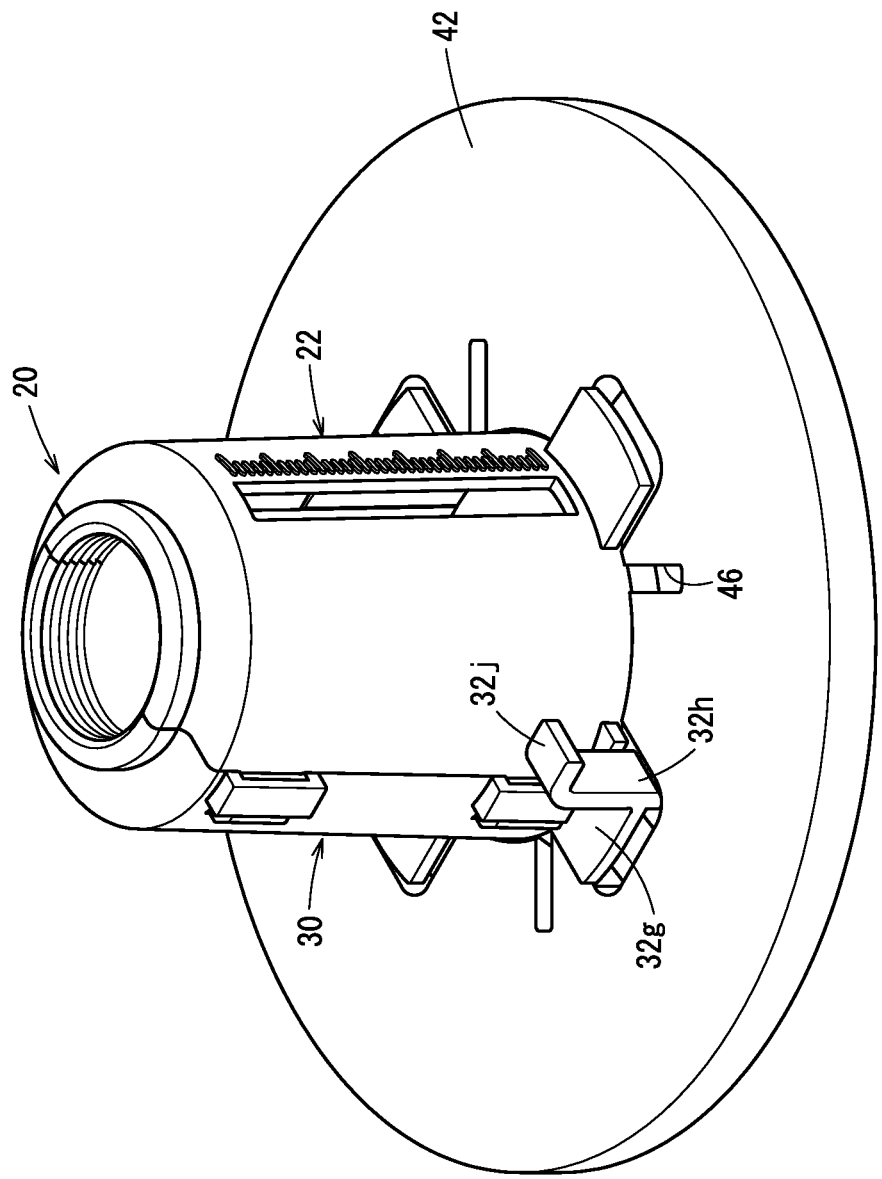
FIG. 12 is a view for explaining a first modification example of an extension-plate positioning structure of the vacuum pad swing prevention mechanism of FIG. 1.

FIG. 12 shows an extension-plate positioning structure according to a first modification example. The fifth projecting piece 32g of the second cover body 30 includes a hook portion 32h for positioning and fixing the extension plate 42 and a lever portion 32j for lifting the hook portion 32h. When the lever portion 32j is lowered in a predetermined direction, the hook portion 32h is lifted.

(Second Modification Example of Extension-Plate Positioning Structure)

Figure 13:
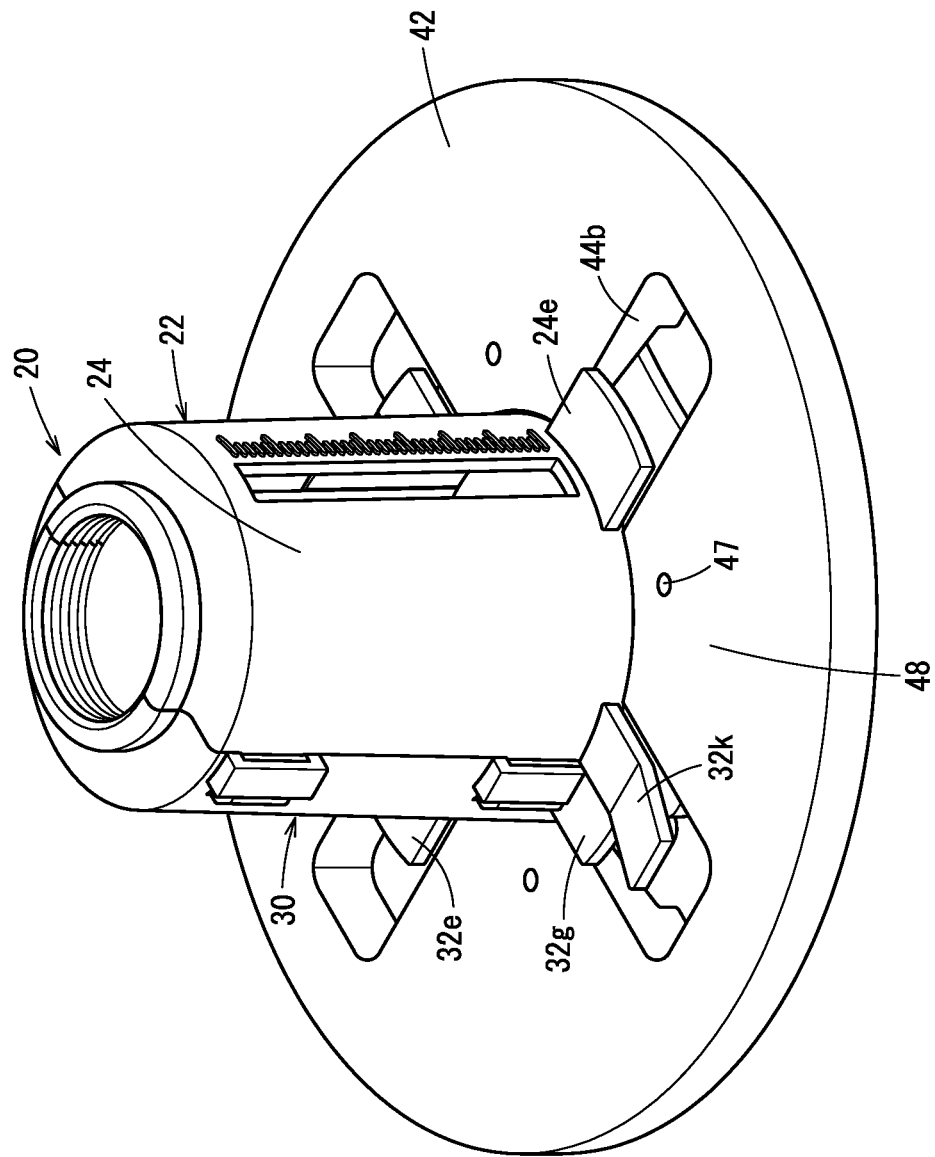
FIG. 13 is a view (before the positioning is performed) for explaining a second modification example of the extension-plate positioning structure of the vacuum pad swing prevention mechanism shown in FIG. 1.
Figure 14:
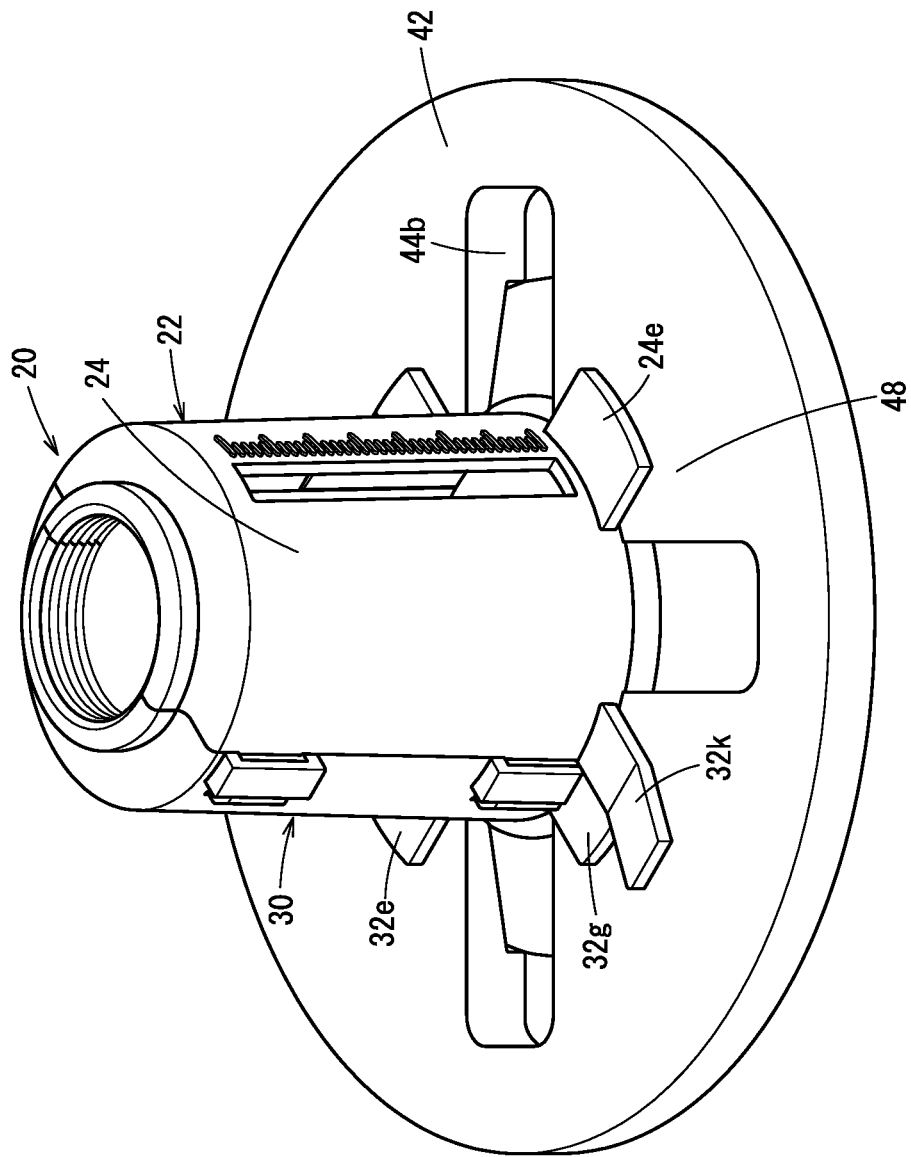
FIG. 14 is a view (after the positioning is performed) for explaining a second modification example of the extension-plate positioning structure of the vacuum pad swing prevention mechanism shown in FIG. 1.

An extension-plate positioning structure according to the second modification example is shown in FIGS. 13 and 14. A lower portion of the body portion 24 of the first cover body 22 is provided with an engaging lever 32k having a predetermined degree of elasticity. A spherical projection (not shown) is formed on the lower surface of the engaging lever 32k. Each peripheral hole 44b of the extension plate 42 has a size that allows the fifth projecting piece 32g and the engaging lever 32k to be inserted therein simultaneously. The insertion portion 48 of the extension plate 42 is formed with a pin hole 47 with which the projection of the engaging lever 32k can engage.

When the extension plate 42 is attached to the cover body 20, the first projecting piece 24e, the continuous projecting piece, the third projecting piece 32e, the fifth projecting piece 32g and the engaging lever 32k of the cover body 20 are inserted into each peripheral hole 44b of the extension plate 42. Thereafter, the extension plate 42 is rotated while the engaging lever 32k is lifted with a force applied to the tip of the engaging lever 32k. When the extension plate 42 is rotated by approximately 45 degrees, the projection of the engaging lever 32k engages with the pin hole 47 of the extension plate 42. Thus, the extension plate 42 is positioned and fixed to the cover body 20 (see FIG. 14).

(Third Modification Example of Extension-Plate Positioning Structure)

Figure 15:
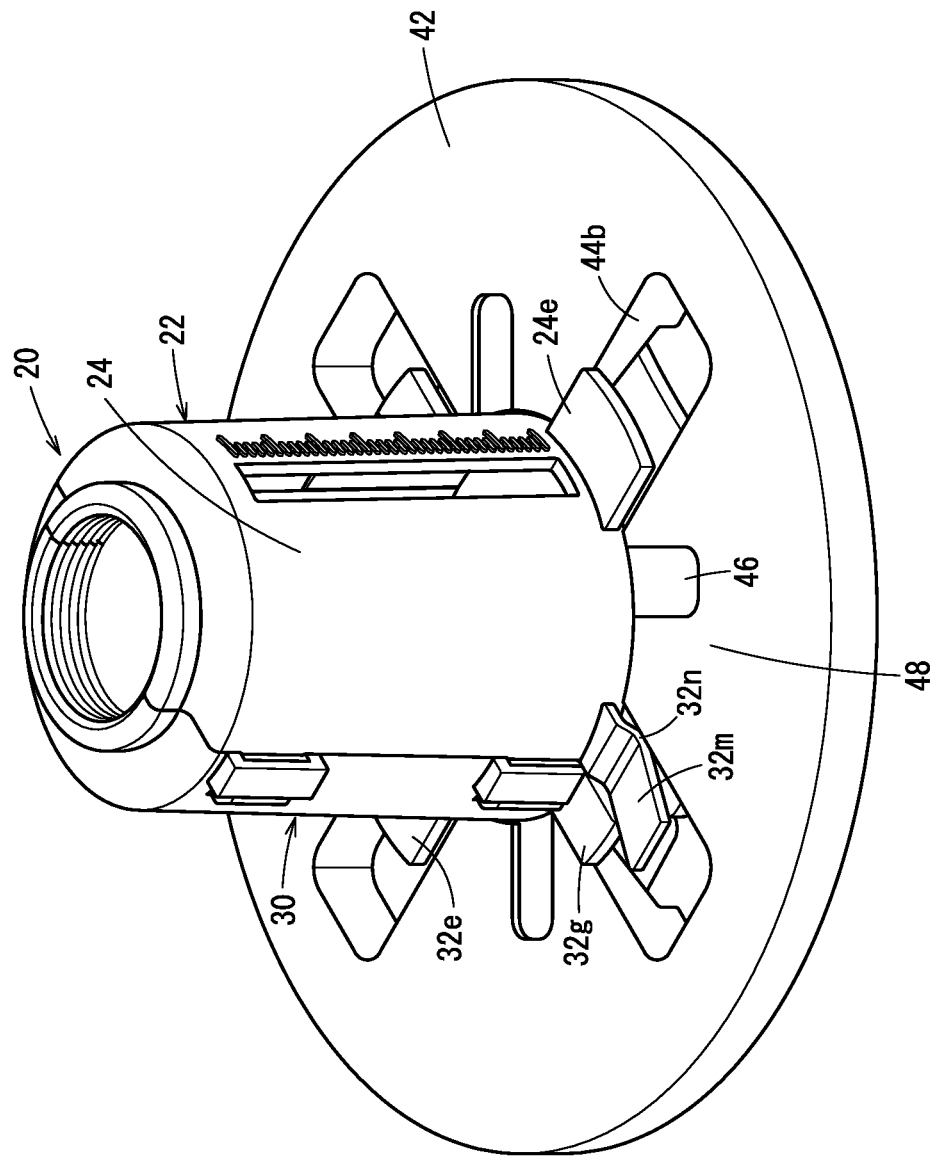
FIG. 15 is a view (before the positioning is performed) for explaining a third modification example of the extension-plate positioning structure of the vacuum pad swing prevention mechanism shown in FIG. 1.
Figure 16:
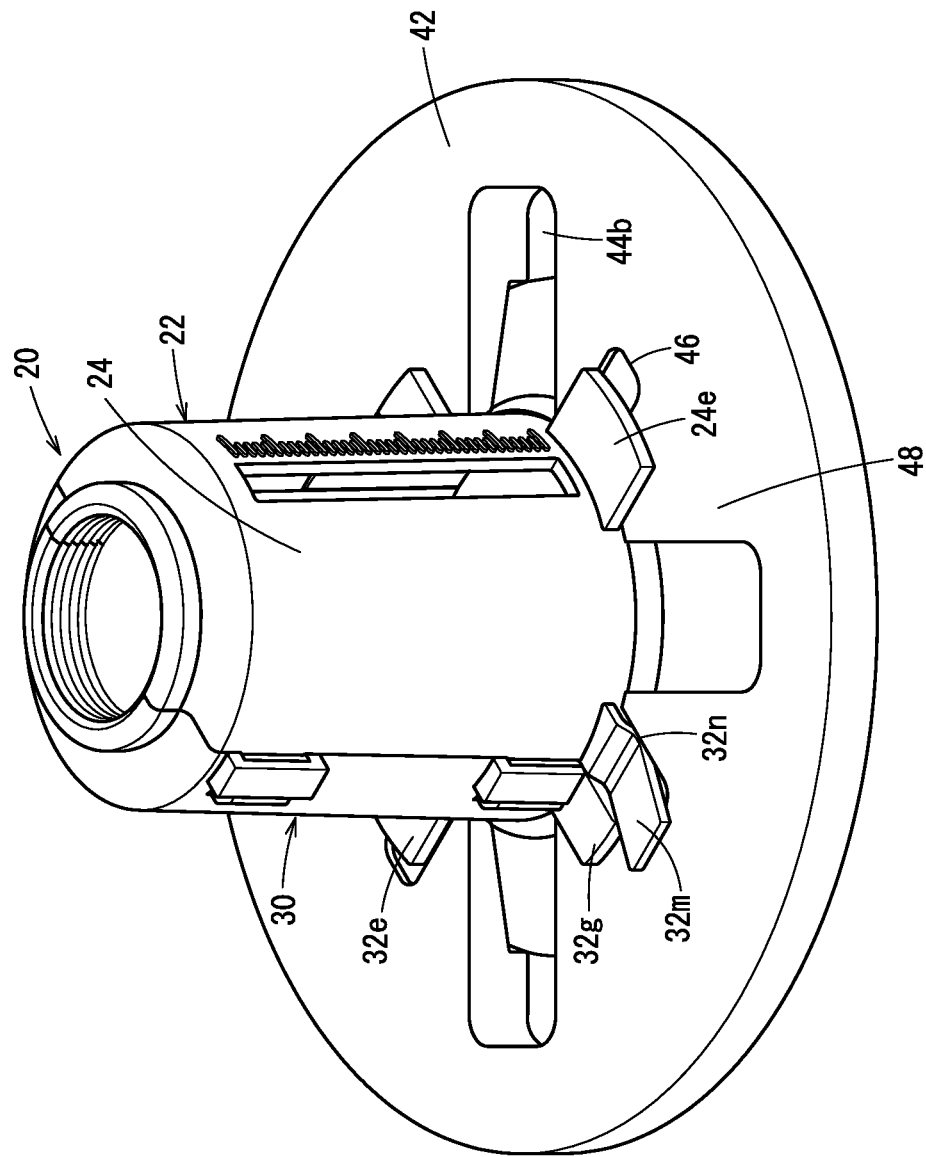
FIG. 16 is a view (after the positioning is performed) for explaining a third modification example of the extension-plate positioning structure of the vacuum pad swing prevention mechanism shown in FIG. 1.

FIGS. 15 and 16 show an extension-plate positioning structure according to the third modification example. A lower portion of the body portion 24 of the first cover body 22 is provided with an engaging lever 32m having a predetermined degree of elasticity. The engaging lever 32m is provided with a rib 32n that curves and projects downward in the width direction. Each peripheral hole 44b of the extension plate 42 has a size that allows the fifth projecting piece 32g and the engaging lever 32m to be inserted therein simultaneously. Further, the slit 46 of the extension plate 42 has the same width as the rib 32n of the engaging lever 32m.

When the extension plate 42 is attached to the cover body 20, the first projecting piece 24e, the continuous projecting piece, the third projecting piece 32e, the fifth projecting piece 32g and the engaging lever 32m of the cover body 20 are inserted into each peripheral hole 44b of the extension plate 42. Thereafter, the extension plate 42 is rotated while the engaging lever 32m is lifted with a force applied to the tip of the engaging lever 32m. When the extension plate 42 is rotated by approximately 45 degrees, the rib 32n of the engaging lever 32m engages with the slit 46 of the extension plate 42. Thus, the extension plate 42 is positioned and fixed to the cover body 20 (see FIG. 16).

The vacuum pad swing prevention mechanism according to the present invention is not limited to the above-described embodiments, and various configurations can be adopted without departing from the gist of the present invention.

The invention claimed is:

1. A vacuum pad swing prevention mechanism comprising:
   a vacuum pad; and
   a cover body attached to the vacuum pad,
   wherein:
   the vacuum pad includes
      a support member that includes a vacuum passage, and
      a bellows that is attached to the support member,
   the cover body includes
      a body portion that is cylindrical,
      an attaching portion projecting from one end of the body portion, and
      a flange portion projecting radially outward from another end of the body portion,
   the cover body covers an outside of the bellows when the bellows contracts and holds a workpiece by suction, and
   the cover body is attached to the vacuum pad by the attaching portion being screwed onto the support member, and an attaching position of the cover body with respect to the vacuum pad is adjustable,
   and wherein
   the cover body includes a first cover body and a second cover body, and
   each of the first cover body and the second cover body includes a body portion that is semi-cylindrical.

2. The vacuum pad swing prevention mechanism according to claim 1, wherein the body portion of the cover body includes a window portion that enables externally checking an attaching position of the bellows.

3. The vacuum pad swing prevention mechanism according to claim 1, wherein the first cover body and the second cover body are connected to each other via a hinge portion so as to be pivotable relative to each other.

4. The vacuum pad swing prevention mechanism according to claim 1, wherein the first cover body and the second cover body are mutually separable members.

5. The vacuum pad swing prevention mechanism according to claim 1, wherein:
   the body portion of the first cover body includes an engaging piece and an engaging concave portion,
   the body portion of the second cover body includes an engaging piece and an engaging concave portion,
   the engaging piece of the body portion of the first cover body engages with the engaging concave portion of the body portion of the second cover body, and
   the engaging piece of the body portion of the second cover body engages with the engaging concave portion of the body portion of the first cover body.

6. The vacuum pad swing prevention mechanism according to claim 1, wherein an extension plate having a hole is attached to the cover body.

7. The vacuum pad swing prevention mechanism according to claim 6, wherein:
   the body portion of the cover body includes a plurality of projecting pieces projecting outward, and
   the plurality of projecting pieces are arranged at equal intervals in a circumferential direction and face the flange portion with a predetermined gap in between.

8. The vacuum pad swing prevention mechanism according to claim 7, wherein the hole of the extension plate includes:
   a central hole that allows the body portion of the cover body to be inserted therethrough, and
   a plurality of peripheral holes that allow the plurality of projecting pieces to be inserted therethrough,
   the extension plate includes an insertion portion between adjacent peripheral holes among the plurality of peripheral holes, and
   the insertion portion enters the gap via which the plurality of projecting pieces and the flange portion of the cover body face each other.

9. The vacuum pad swing prevention mechanism according to claim 8, wherein:
   one of the plurality of projecting pieces includes a hook portion at a tip of which a slit is formed, and
   the hook portion elastically engages with a slit formed at the insertion portion of the extension plate when the extension plate is at a predetermined position about an axis of the cover body.

10. The vacuum pad swing prevention mechanism according to claim 8, wherein:
    one of the plurality of projecting pieces includes a hook portion and a lever portion configured to lift the hook portion, and
    the hook portion elastically engages with a slit formed at the insertion portion of the extension plate when the extension plate is at a predetermined position about an axis of the cover body.

11. The vacuum pad swing prevention mechanism according to claim 8, wherein:
    the body portion of the cover body includes an engaging lever, and
    a spherical projection formed at the engaging lever engages with a pin hole formed at the insertion portion of the extension plate when the extension plate is at a predetermined position an axis of the cover body.

12. The vacuum pad swing prevention mechanism according to claim 8, wherein:
    the body portion of the cover body includes an engaging lever, and
    a rib of the engaging lever engages with a slit formed at the insertion portion of the extension plate when the extension plate is at a predetermined position about an axis of the cover body.

13. The vacuum pad swing prevention mechanism according to claim 6, wherein the extension plate is constituted by a plate portion and a tubular skirt portion extending from an outer periphery of the plate portion.

14. The vacuum pad swing prevention mechanism according to claim 6, wherein the extension plate is constituted by combining a plate body and a plurality of guide shafts arranged in a direction perpendicular to a plate surface of the plate body.

15. The vacuum pad swing prevention mechanism according to claim 14, wherein:
    the plate body includes a plurality of slits cut inward from an outer peripheral edge of the plate body, and
    the guide shafts each including an outer thread are inserted into the plurality of slits and fixed to the plate body with a pair of nuts.

16. The vacuum pad swing prevention mechanism according to claim 1, wherein a plurality of the cover bodies are attached to one extension plate.

17. A vacuum pad swing prevention mechanism comprising:
    a vacuum pad; and
    a cover body attached to the vacuum pad,
    wherein:
    the vacuum pad includes
       a support member that includes a vacuum passage, and a bellows that is attached to the support member,
the cover body includes
a body portion that is chlindrical,
an attaching portion projecting from one end of the body portion, and
a flange portion projecting radially outward from another end of the body portion,
the cover body covers an outside of the bellows when the bellows contracts and holds a workpiece by suction, and
the cover body is attached to the vacuum pad by the attaching portion being screwed onto the support member, and an attaching position of the cover body with respect to the vacuum pad is adjustable,
and wherein
the body portion of the cover body includes a window portion that enables externally checking an attaching position of the bellows.

\* \* \* \* \*